United States Patent Office 3,349,393
Patented Oct. 24, 1967

3,349,393
CW-FM DISTANCE MEASURING SYSTEM
John V. Hughes, Lytham St. Anne's, England, assignor to United Aircraft Corporation, East Hartford, Conn., a corporation of Delaware
Filed Nov. 4, 1964, Ser. No. 408,784
19 Claims. (Cl. 343—14)

My invention relates to distance measuring systems and more particularly to an improved frequency modulated continuous wave system employing two carrier frequencies for the simultaneous measurement of both distance and velocity.

In the prior art, continuous-wave fixed frequency Doppler systems have been employed to determine velocity by comparing the frequency shift between the transmitted and received signals. Distance has also been measured using a frequency modulated continuous wave. The frequency shift between the transmitted and received signals is proportional to the distance of the reflecting target provided that its velocity is zero so that it occasions no Doppler shift in frequency.

In order to distinguish against Doppler shift due to velocity of the reflecting target, one system of the prior art frequency modulates the transmitted signal with a symmetrical triangular waveform having equal positive and negative slopes so that the Doppler frequency shift during the rising portion of the waveform is opposed by the frequency shift during the falling portion of the waveform. The average frequency over a complete cycle of the modulating waveform is thus proportional to distance and independent of velocity. However, such system depends upon the averaging of frequencies over an extended period of time, introducing an appreciable time delay in the distance measurement which is especially disadvantageous where either velocity or distances or where both are changing rapidly.

Another system of the prior art employs two continuous carrier signals, one of which is of fixed frequency and the other of which is subjected to a saw-tooth frequency modulation. The fixed frequency signal is employed to obtain the Doppler velocity; and this velocity signal is used to correct the distance indication obtained from the frequency modulated signal for the frequency shift due to motion of the reflecting target. Such system employing two carriers has the advantage that instantaneous measurement of both velocity and distance may be made.

I have found that greater accuracy in the distance measurement is achieved by taking advantage of the digital nature of the difference frequencies. Accordingly I correct for the Doppler shift in the frequency modulated signal by directly adding or subtracting this frequency rather than by adding or subtracting an analog representation of the Doppler frequency obtained from the output of a discriminator. I have further found that the direct adding or subtracting of frequencies is facilitated by frequency modulating both transmitted signals with the same waveform such that the instantaneous frequency difference between the two transmitted signals is constant and integrally divisible into each of the transmitted frequencies. This permits the use of transmitted signals in the same frequency band so that a common antenna may be used for both signals.

One object of my invention is to provide a CW-FM distance measuring system employing two different transmitted frequencies lying within the same band.

Another object of my invention is to provide a CW-FM distance measuring system wherein two distinct transmitted signals are both subjected to frequency modulation such that the instantaneous frequency difference between the two signals is constant and integrally divisible into each of the transmitted frequencies.

A further object of my invention is to provide a CW-FM distance measuring system in which Doppler compensation is obtained by directly adding or subtracting frequencies rather than adding or subtracting their analog equivalents.

A still further object of my invention is to provide a CW-FM distance measuring system in which the proper scaling of the velocity compensating signal is obtained by the use of frequency multipliers rather than by the use of frequency dividers.

A still further object of my invention is to provide a CW-FM measuring system in which frequency addition or subtraction is facilitated by the use of appropriate intermediate frequencies.

Other and further objects of my invention will appear from the following description.

In general my invention contemplates the provision of an auxiliary signal which is frequency modulated in accordance with a certain waveform. The auxiliary signal is employed to generate two distinct transmitted signals which both contain the frequency modulation of the first signal and have a constant frequency difference. After reflection from a target, the signal received at the higher frequency will contain a larger frequency shift due to velocity than the lower frequency signal. In a first embodiment of my invention the received signals are each modulated by the auxiliary signal to provide a pair of intermediate signals having frequency shifts dependent only upon distance and velocity and free from the original frequency modulation. Each of the two intermediate signals contains the same frequency shift as a function of distance but different frequency shifts due to velocity. The two intermediate signals are applied to a difference modulator which provides an output having a frequency shift independent of the distance and proportional only to velocity but with a reduced scale factor. The output of the difference modulator is then frequency multiplied so that the velocity frequency shift output of the multiplier is brought to the same scale factor as a certain one of the two intermediate signals. The output of the frequency multiplier is then combined with such one of the intermediate signals in a second difference modulator to eliminate from such intermediate signal the frequency shift due to velocity and thus provide a frequency shift proportional only to distance.

In a second embodiment of my invention the two received signals are directly applied to a difference modulator which provides an output signal having a frequency shift independent of distance and of the original frequency modulation and proportional only to velocity, but with a reduced scale factor. The output signal of the difference modulator is then frequency multiplied so that the velocity frequency shift output of the multiplier is brought to the same scale factor as a certain one of the two received signals. Such one of the two received signals is combined with the noncorresponding one of the transmitted signals in a second difference modulator to eliminate the original frequency modulation and provide a resultant signal having a frequency shift dependent only upon distance and velocity. The output of the frequency multiplier is then combined with the resultant signal in a third difference modulator to eliminate from such resultant signal the frequency shift due to velocity and thus provide a frequency shift proportional only to distance.

In the accompanying drawings which form part of the instant specification and which are to be read in conjunction therewith and in which like reference numerals are used to indicate like parts in the various views, FIGURE 1 is a schematic view of the first embodiment of my invention in which the output of the frequency multiplier is combined with the higher frequency intermediate signal.

Figure 1:
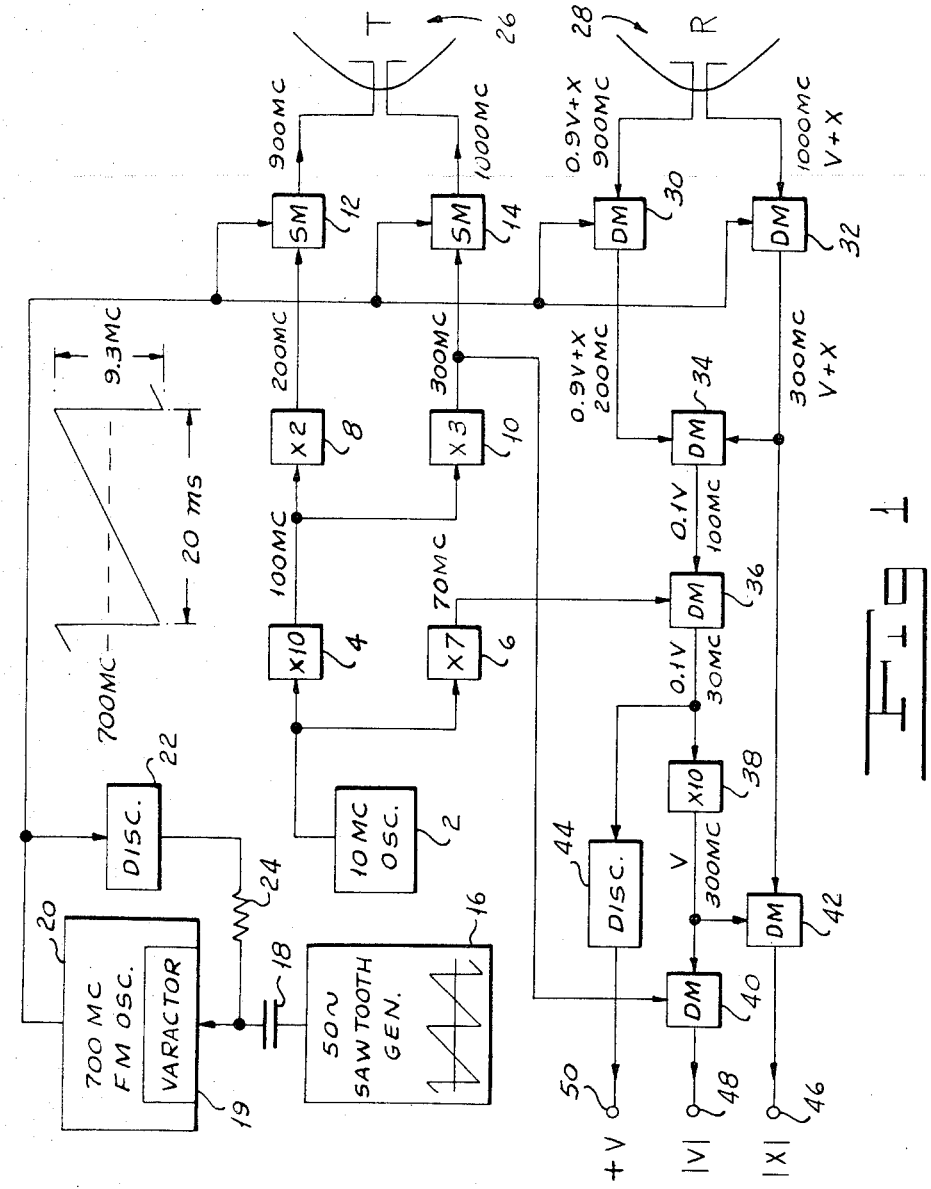

Referring now more particularly to FIGURE 1 of the drawings, a 10 megacycle crystal controlled oscillator 2 drives a frequency multiplier 6 having a multiplication factor of ten to provide an output of 100 mc. and also drives a frequency multiplier 6 having a mulitplication factor of seven to provide an output of 70 mc. The 100 mc. output of frequency multiplier 4 drives a frequency multiplier 8 having a multiplication factor of two to provide an output of 200 mc. and also drives a frequency multiplier 10 having a multiplication factor of three to provide an output of 300 mc. A 50 cycle per second saw-tooth generator 16 provides a waveform comprising a linearly rising ramp with a rapid negative going retrace. The output of saw-tooth generator 16 is coupled through a capacitor 18 to a varactor 19 associated with resonant frequency determining circuit of a 700 mc. frequency modulated oscillator 20. Varactor 19 may comprise a backwardly biased junction diode, the junction capacitance of which varies as a function of the reverse voltage. The output of oscillator 20 is coupled to a discriminator 22 having a center frequency of 700 mc. The output of discriminator 22 is coupled through a resistor 24 to varactor 19. The output of oscillator 20 may have a frequency deviation on either side of its 700 mc. center frequency of plus or minus 4.65 mc., thus providing a total frequency swing of 9.3 mc. Thus during successive periods of 20 milliseconds, the output of scillator 20 rises linearly from 695.35 mc. to 704.65 mc. The modulation index is $$\frac{4.65 \times 10^6}{50} = 93 \times 10^3 \text{ radians}$$

With such a large modulation index the band width required for transmitting the frequency modulated signal is hardly larger than 9.3 mc. Discriminator 22 provides the direct current component necessary for maintaining the center frequency of oscillator 20 at the proper value. Resistor 24, in combination with capacitor 18, forms a high pass filter for coupling the alternating current output of saw-tooth generator 16 to varactor 19 and at the same time forms a low-pass filter for coupling the direct current component of the output of discriminator 22 to varactor 19. The 200 mc. output of multiplier 8 is coupled to one input of a modulator 12; and the 300 mc. output of multiplier 10 is coupled to one input of a modulator 14. The output of oscillator 20 is coupled to the other output of each of modulators 12 and 14. Modulators 12 and 14 are sum modulators, the outputs of which are tuned to frequencies corresponding to the sums of their input frequencies. Accordingly the output of modulator 12 is tuned to a frequency of 900 mc. and the output of modulator 14 is tuned to a frequency of 1000 mc. The output circuit of each of modulators 12 and 14 should have a band width of approximately 10 mc. The outputs of modulators 12 and 14 are coupled to respective quarter wave length stubs associated with a directive transmitting antenna indicated generally by the reference numeral 26. Antenna 26 should have a band width appreciably exceeding 100 mc. and slightly greater than 110 mc. with a center frequency of 950 mc. Harmonics of the 200 mc. input from multiplier 8 cannot appear in the output of modulator 12, since the fourth and fifth harmonics thereof have respective frequencies of 800 mc. and 1000 mc. which are each separated by 100 mc. from the 900 mc. output modulator 12. Similarly the third harmonic of the 300 mc. output of multiplier 10 is 900 mc. whereas its fourth harmonic is 1200 mc; and both of these are adequately separated from the 1000 mc. output of modulator 14. A directive receiving antenna indicated generally by the reference numeral 28 is provided with a pair of stubs which are coupled to a first input of respective modulators 30 and 32. Transmitting and receiving antennas 26 and 28 may be identical and similarly directed. The first input to modulator 32 has a nominal center frequency of 1000 mc. For electromagnetic radiation having a velocity of 300 meters per microsecond, a frequency of 1000 mc. is associated with a wave length of 0.3 meter which corresponds approximately to 1 foot. Thus if a reflecting target is moving with a velocity of 1000 feet per second or approximately 680 miles per hour, a frequency shift of approximately 1000 cycles per second will result. Thus for a transmitted frequency of 1000 mc. the sensitivity of frequency shift with velocity is 1 cycle/second per foot/second.

I shall assume that the maximum range of my distance measuring system is approximately 186 miles. Since the velocity of light is 186 miles per millisecond the time period between transmission and reception for an object at this range will be 2 milliseconds. I have selected the period of ramp generator 16 to be much larger than this time interval. Conveniently I have chosen a factor of ten so that the period of ramp generator 16 is 20 milliseconds. For an object at the maximum range of 186 miles the frequency shift between transmitted and received signals will be .93 mc. The sensitivity is thus $$\frac{.93 \times 10^6}{186} = 5000 \text{ cycles/second per mile}$$

The sensitivity of distance measurement is approximately 1 cycle/second per foot. The signal to the first input of modulator 32 deviates from the output of modulator 14 by a number of cycles which is equal to $V+X$ where X is distance expressed in feet and V is velocity expressed in feet per second. The signal to the first input of modulator 30 deviates from the output of modulator 12 by a number of cycles equal to $0.9 V+X$. Since both signals transmitted from antenna 26 have the same rate of change of frequency with time, each of the signals received by antenna 28 have the same sensitivity to distance X. However, the sensitivity to velocity varies proportionally with the center frequencies transmitted. Accordingly if a 1000 mc. signal has a velocity sensitivity of 1 cycle/second per foot/second then a 900 mc. signal has a velocity sensitivity of 0.9 cycle/second per foot/second. The frequency modulated output of oscillator 20 is coupled to a second input of each of modulators 30 and 32. Modulators 30 and 32 are difference modulators, the outputs of which are tuned to frequencies corresponding to the difference between the input signals applied. Accordingly the output of modulator 30 is tuned to 200 mc. and the output of modulator 32 is tuned to 300 mc. The output of modulator 30 deviates from 200 mc. by a number of cycles equal to $0.9 V+X$; and the output of modulator 32 deviates from 300 mc. by a number of cycles equal to $V+X$. The outputs of these modulators are free from the original frequency modulation. The outputs of modulators 30 and 32 are coupled to a difference modulator 34, the output of which is tuned to 100 mc., but deviates therefrom by a number of cycles equal to 0.1 V. The 70 mc. output of frequency multiplier 6 and the output of modulator 34 are coupled to a further difference modulator 36, the output of which is tuned to 30 mc. but which deviates therefrom by a number of cycles equal to 0.1 V. The output of modulator 36 is coupled to a frequency multiplier 38 having a factor of multiplication of ten to provide an output which deviates from 300 mc. by a number of cycles equal to V. The outputs of multiplier 38 and modulator 32 are impressed upon a difference modulator 42 which provides an output at terminal 46 which deviates from zero cycles per second by a number of cycles equal to the absolute value of distance X.

The output of modulator 42 should have a low-pass characteristic ranging from direct current up to at least .93 mc. if a range of 186 miles is desired or up to 1.86 mc. if a range of 372 miles is required. The outputs of frequency multipliers 38 and 10 are coupled to a difference modulator 40 which provides an output at terminal 48 which deviates from zero cycles per second by a number of cycles equal to the absolute value of velocity V. The output of modulator 40 should have a low-pass characteristic ranging from direct current up to 1000 cycles per second if target velocities of 1000 feet per second are desired or up to 3000 cycles per second if target velocities of 3000 feet per second are required. The output of modulator 36 is coupled to a discriminator 44 having a center frequency of 30 mc. The direct current output of discriminator 44 is coupled to a terminal 50 where it provides a polarity sensitive analog indication of the target velocity V. The output signal at terminal 50 may have any convenient scale factor of voltage versus velocity. Preferably, however, the output at terminal 50 is employed merely to indicate the polarity of the absolute digital velocity at terminal 48.

It will be noted that the subtraction of V from $V+X$ is performed with digital precision in difference modulator 42. It will be further noted that the two inputs to difference modulator 42 have the same scale factor for velocity V so that the velocity term may be eliminated in order to obtain the distance X. It will be finally noted that the compensating velocity signal applied to modulator 42 is obtained without the use of frequency dividing apparatus and solely through the use of the frequency multiplier 38. Apparatus for performing frequency multiplication is of a simple and straightforward nature. Frequency dividing apparatus on the other hand requires critical adjustment to maintain synchronism and does not operate dependably at higher frequencies.

It will also be noted that the output of modulator 34 is obtained with a sensitivity or scale factor for velocity which is one-tenth that of the 1000 mc. signal. Such sensitivity corresponds to a transmitted signal of 100 mc. Yet no such signal is either transmitted or received. Antennas 26 and 28 need respond only over a relatively narrow range of frequencies rather than over a range of two-to-one or even ten-to-one in frequency.

Figure 2:
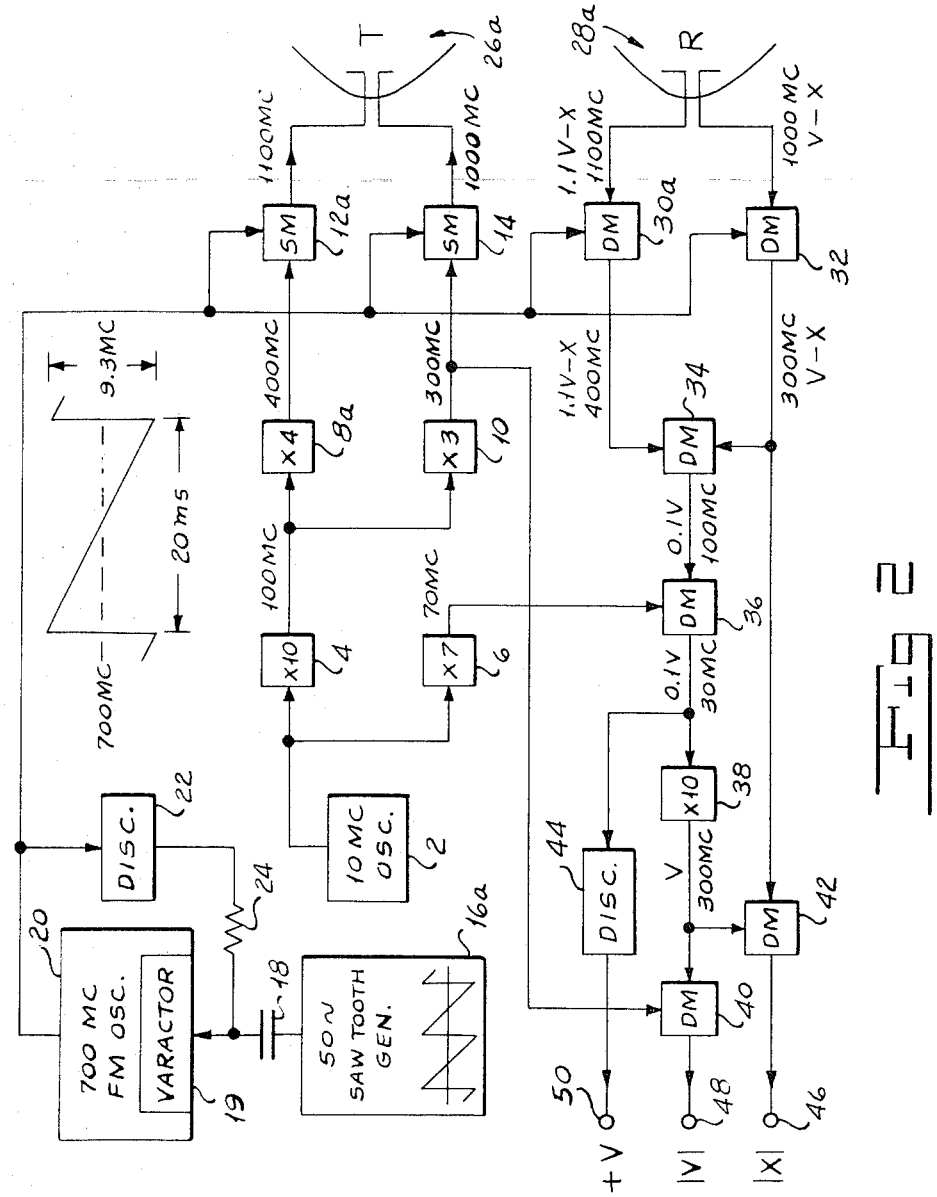
FIGURE 2 is a schematic view of the first embodiment of my invention in which the output of the frequency multiplier is combined with the lower frequency intermediate signal.

Referring now to FIGURE 2, saw-tooth generator 16a provides a 50 cycle output waveform comprising a ramp of negative slope with a rapid positive going retrace. In this case the output of oscillator 20 during successive 20 millisecond periods decreases linearly from 704.65 mc. to 695.35 mc. Again the total frequency swing is 9.3 mc. In FIGURE 2 the 100 mc. output of multiplier 4 is coupled to a frequency multiplier 8a having a factor of multiplication of four to provide an output of 400 mc. The sum modulator 12a provides an output which is in this case tuned to 1100 mc. and again has a band width of approximately 10 mc. The second harmonic of the 400 mc. output of multiplier 8a is 800 mc. while the third harmonic thereof is 1200 mc.; and these harmonics are well separated from the 1100 mc. output of modulator 12a. Transmitting antenna 26a and receiving antenna 28a should have center frequencies of 1050 mc. with band widths of slightly greater than 110 mc. Since the frequency modulation ramp is negative going in FIGURE 2, the polarity of the difference signals occasioned by the distance X is negative. Accordingly the first input to modulator 32 deviates from the output of modulator 14 by a number of cycles equal to $V-X$. Since the transmitted signal from modulator 12a has a center frequency of 1100 mc., the velocity sensitivity of received signals centered at this frequency will be 1.1 cycle/second per foot/second. Accordingly the first input to modulator 30a deviates from the output of modulator 12a by a number of cycles equal to $1.1 V-X$. The output of modulator 32 is tuned to 300 mc. and deviates therefrom by a number of cycles equal to $V-X$. The output of difference modulator 30a is tuned to 400 mc. and deviates therefrom by a number of cycles equal to $1.1 V-X$. Difference modulator 34 is again tuned to 100 mc. and provides an output which deviates therefrom by a number of cycles equal to $0.1 V$.

In FIGURE 1 the distance indication at terminal 46 is obtained from that one of the reflected signals coupled to modulators 32 and 30 having the higher frequency. In FIGURE 2 the distance indication at terminal 46 is obtained from that one of the reflected signals coupled to modulators 32 and 30a having the lower frequency. It is desired that the difference between the center frequencies of the transmitted signals be an integral fraction of each of such signals. Thus the difference in velocity sensitivities of the two signals will also be an integral fraction of the velocity sensitivity of each of the signals. Since this difference in velocity sensitivity is obtained from the output of modulator 34, the multiplication of the output of modulator 34 by an integral factor will yield a velocity representation having the same sensitivity as one of the two received signals.

Figure 3:
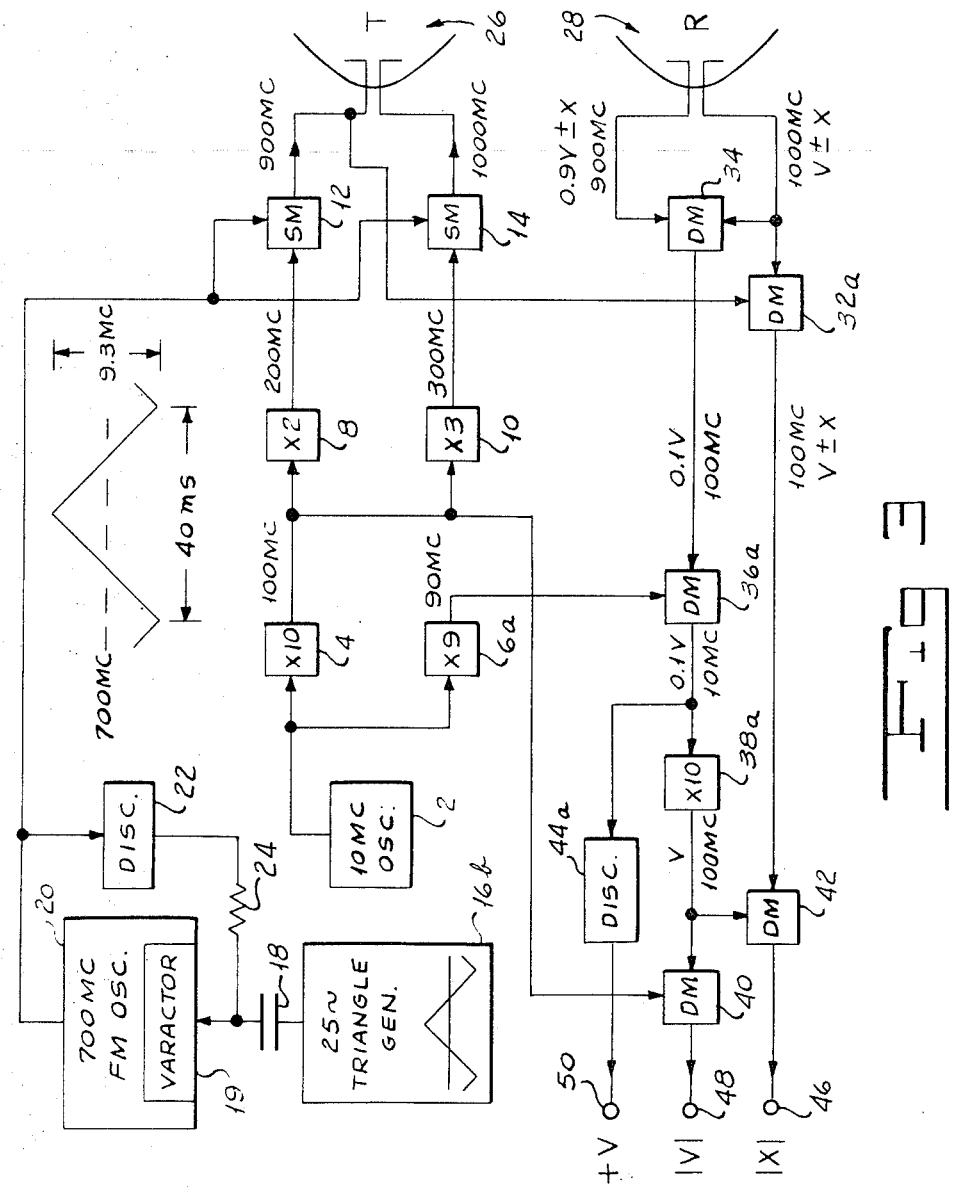
FIGURE 3 is a schematic view of the second embodiment of my invention in which the higher frequency received signal is used to provide the resultant signal.

Referring now to FIGURE 3, I have provided a 25 cycle per second triangular waveform generator 16b having ramps of equal positive and negative slope for alternate 20 ms. intervals. The output of oscillator 20 again has a frequency swing of plus and minus 4.65 mc. and a total frequency swing of 9.3 mc. During the positive portion of the ramp the distance indications are positive; and during the negative portion of the ramp the distance indications are negative. The center frequencies transmitted are, as in FIGURE 1, 900 mc. and 1000 mc. The nominal 900 mc. signal received by antenna 28 deviates from the output of modulator 12 by a number of cycles equal to $0.9 V \pm X$. The nominal 1000 mc. signal received by antenna 28 deviates from the output of modulator 14 by a number of cycles equal to $V \pm X$. These two received signals are directly applied to difference modulator 34 which again provides an output which deviates from 100 mc. by a number of cycles equal to $0.1 V$. Since each of the two signals impressed upon modulators 34 contain the original frequency modulation, the output of difference modulator 34 is free from such frequency modulation. The nominal 1000 mc. signal received by antenna 28 is also impressed on one input of a difference modulator 32a, the other input of which is derived from the output of modulator 12. Modulator 32a in this case is tuned to 100 mc. and deviates therefrom by a number of cycles equal to $V \pm X$. The output of 10 mc. oscillator 20 is coupled to a frequency multiplier 6a having a multiplication factor of nine to provide an output of 90 mc., which is applied to modulator 36a. The output of modulator 36a is tuned to 10 mc. and deviates therefrom by a number of cycles equal to $0.1 V$. The output of frequency multiplier 38a is tuned to 100 mc. and deviates therefrom by a number of cycles equal to V. The output of modulator 42 again deviates from zero cycles per second by a number of cycles equal to the absolute value of X; and both positive and negative distance indications have the same absolute frequency. The output of multiplier 38a is coupled to modulator 40 where it is combined with the 100 mc. output of frequency multiplier 4 to obtain at terminal 48 an output which deviates from zero cycles per second by a number of cycles equal to the absolute value of V. Discriminator 44a has in this case a center frequency of 10 mc.

Figure 4:
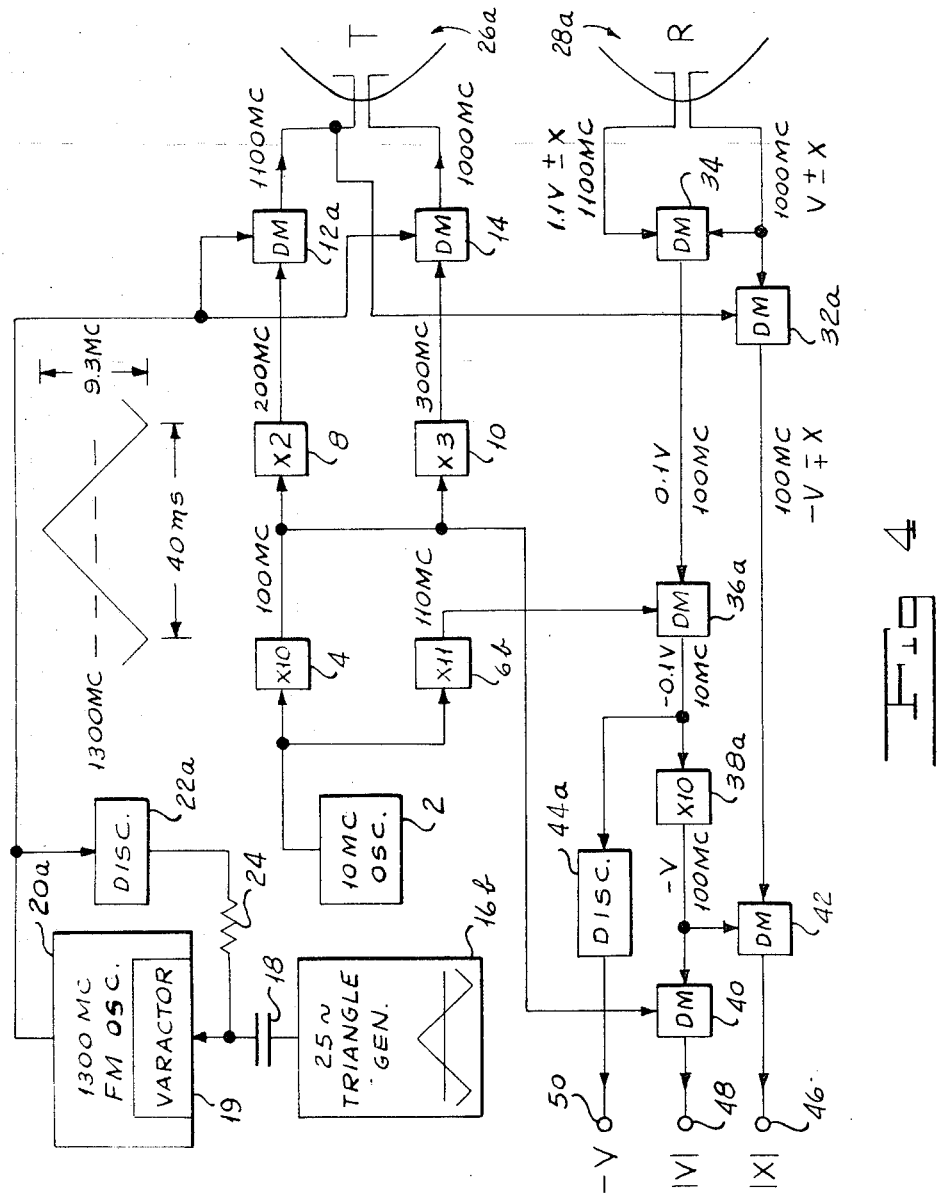
FIGURE 4 is a schematic view of the second embodiment of my invention in which the lower frequency received signal is used to provide the resultant signal.

Referring now to FIGURE 4 the frequency modulated signals transmitted have center frequencies of 1100 mc. and 1000 mc. as in FIGURE 2. However, frequency modulated oscillator 20a provides an average output frequency of 1300 mc. Discriminator 22a has a center frequency of 1300 mc. The frequency deviation from 1300 mc. is again ±4.65 mc., causing a total frequency swing of 9.3 mc. Frequency multiplier 8 has a multiplication factor of two as in FIGURES 1 and 3 rather than a multiplication factor of four as in FIGURE 2. Modulators 12a and 14 are now difference modulators, yet may have the same construction as in FIGURE 2. The fifth and sixth harmonics of the 200 mc. input from multiplier 8 have frequencies of 1000 mc. and 1200 mc. which are adequately separated from the 1100 mc. output of difference modulator 12a. The frequency modulation is again of triangular waveform as provided by 25 cycle generator 16b. The signals received from antenna 28a are again directly coupled to difference modulator 34. The nominal 1100 mc. received signal differs from the output of modulator 12a by a number of cycles equal to 1.1 $V+X$. Similarly the nominal 1000 mc. received signal deviates from the output of modulator 14 by a number of cycles equal to $V \pm X$. The nominal 1000 mc. received signal is coupled to one input of difference modulator 32a. The frequency modulated 1100 mc. transmitted signal from modulator 12a is coupled to the other input of modulator 32a. The output of modulator 32a is tuned to 100 mc. and deviates from this frequency by a number of cycles equal to $-V \mp X$. The inversion of signs comes about because the signal from modulator 12a has a greater frequency than the signal from antenna 28a. Frequency multiplier 6b has a multiplication factor of eleven to provide an output of 110 mc. so that the output of modulator 36a deviates from 10 mc. by a number of cycles equal to $-0.1$ V. Thus, the sign of the output of modulator 36a is also inverted. The output of frequency multiplier 38a now deviates from 100 mc. by a number of cycles equal to $-V$. Since the output of modulator 32a and the output of frequency multiplier 38a both contain the term $-V$, the subtraction effected by difference modulator 42 results in the elimination of the negative velocity term.

In FIGURE 3 the distance indication at terminal 46 is obtained from that one of the reflected signals having the higher frequency. In FIGURE 4 the distance indication at terminal 46 is obtained from that one of the reflected signals having the lower frequency. Again it is desired that the difference between the center frequencies of the transmitted signals be an integral fraction of such signals so that the multiplication of the output of modulator 34 by an integral factor will yield a velocity representation having the same sensitivity or scale factor as one of the two received signals.

In FIGURES 3 and 4 the low sensitivity velocity signal is directly obtained from the combination of the two received signals in modulator 34; and modulator 30 of FIGURE 1 and modulator 30a of FIGURE 2 may be eliminated.

It will be appreciated that in the various figures, waveform generators 16, 16a, and 16b may be used interchangeably with equal effect.

It will be appreciated that while I have shown a system employing electromagnetic energy, my invention is equally applicable to systems employing sound energy either in water or in air.

It will be noted that in each instance where frequencies are to be algebraically combined, either additively as in the transmitter or subtractively as in the receiver, the input frequencies of each modulator have been so selected as not to interfere with its output. In FIGURES 1 through 4 no harmonics of the outputs of circuits 8, 8a, and 10 interfere with the outputs of modulators 12, 12a, and 14. In FIGURES 1 and 2 neither of the inputs to difference modulator 34 interfere with its output. In FIGURES 3 and 4 neither of the inputs to difference modulator 32a interfere with its output. In FIGURES 1 through 4 neither of the inputs to difference modulators 36 and 36a interfere with its output. In all cases the intermediate reference frequencies are appreciably greater than the information frequencies except for the final outputs from difference modulators 40 and 42 which provide velocity and distance indications having reference frequencies of zero cycles per second. In FIGURES 3 and 4 the provision of a zero frequency reference for the distance indication at terminal 46 is of significance, since it is only for a reference frequency of zero that the absolute value of X may be provided to compensate for the alternate positive and negative distance indications produced by the triangular waveform frequency modulation.

It will be seen that I have accomplished the objects of my invention. Doppler compensation is obtained by directly subtracting frequencies in modulator 42, thus effecting the compensation with digital precision. The proper scaling of the velocity compensation signal is achieved solely through the use of frequency multipliers 38 and 38a rather than by the use of frequency dividers. All intermediate reference frequencies are appreciably removed from the information frequencies except in the production of the final outputs where the reference frequencies are zero.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. A distance measuring system including in combination means for transmitting a first and a second frequency modulated signal of different frequencies, the signals having certain average frequencies and a constant instantaneous frequency difference, the average frequency of the first signal being a certain integral multiple of said difference frequency, first means for receiving reflections of the first signal, second means for receiving reflections of the second signal, a first and a second modulator each having a pair of inputs and providing an output in accordance with the difference in frequencies of its inputs, means coupling the first and second receiving means to the respective inputs of the first modulator, a frequency multipler having a factor of multiplication equal to said certain integral multiple, means coupling the first modulator output to the frequency multiplier, and means coupling the first receiving means and the frequency multiplier to the respective inputs of the second modulator.

2. A distance measuring system including in combination means for transmitting a first and a second frequency modulated signal of different frequencies, the instantaneous frequency difference between the two signals being constant, first means for receiving reflections of the first signal, second means for receiving reflections of the second signal, a first and a second modulator each having a pair of inputs and providing an output in accordance with the difference in frequency of its inputs, means coupling the first and second receiving means to the respective inputs of the first modulator, and means coupling the first receiving means and the output of the first modulator to the respective inputs of the second modulator.

3. A distance measuring system including in combination means for providing a frequency modulated signal, means providing a first and a second constant frequency signal of different frequencies, a first and a second modulator each having a first and a second input and providing an output in accordance with the same algebraic combination of frequencies of its inputs, means coupling the first and second signals to the respective first inputs of the first and second modulators, means coupling the frequency modulated signal to the second input of the first and second modulators, the outputs of the first and second modulators having certain average frequencies and a constant instantaneous frequency difference equal to the difference in frequencies of the first and second signals, the average output frequency of the first modulator being a certain integral multiple of said difference frequency, means for transmitting the outputs of the first and second modulators, first means for receiving reflections of the transmitted output of the first modulator, second means for receiving reflections of the transmitted output of the second modulator, a third and a fourth modulator each having a first and a second input and providing on output in accordance with the difference in frequencies of its inputs, means coupling the first and second receiving means to the respective first inputs of the third and fourth modulators, means coupling the frequency modulated signal to the second input of the third and fourth modulators, a fifth and a sixth modulator each having a pair of inputs and providing an output in accordance with the difference in frequencies of its inputs, means coupling the outputs of the third and fourth modulators to the respective inputs of the fifth modulator, a frequency multiplier having a factor of multiplication equal to said certain integral multiple, means coupling the fifth modulator output to the frequency multiplier, and means coupling the output of the third modulator and the frequency multiplier to the respective inputs of the sixth modulator.

4. A distance measuring system including in combination means for providing a frequency modulated signal, means providing a first and a second constant frequency signal of different frequencies, a first and second modulator each having a first and a second input and providing an output in accordance with the same algebraic combination of frequencies of its inputs, means coupling the first and second signals to the respective first inputs of the first and second modulators, means coupling the frequency modulated signal to the second input of each modulator, the outputs of the first and second modulators having a constant instantaneous frequency difference equal to the difference in frequencies of the first and second signals, means for transmitting the outputs of the first and second modulators, first means for receiving reflections of the transmitted output of the first modulator, second means for receiving reflections of the transmitted output of the second modulator, a third and a fourth modulator each having a first and a second input and providing an output in accordance with the difference in frequencies of its inputs, means coupling the first and second receiving means to the respective first inputs of the third and fourth modulators, means coupling the frequency modulated signal to the second input of the third and fourth modulators, a fifth and a sixth modulator each having a pair of inputs and providing an output in accordance with the difference in frequencies of its inputs, means coupling the outputs of the third and fourth modulators to the respective inputs of the fifth modulator, and means coupling the outputs of the fourth and fifth modulators to the respective inputs of the sixth modulator.

5. A distance measuring system including in combination means for transmitting a first and a second frequency modulated signal of different frequencies, the signals having certain average frequencies and a constant instantaneous frequency difference, the average frequency of the first signal being a certain integral multiple of said difference frequency, first means for receiving reflections of the first signal, second means for receiving reflections of the second signal, a first and a second and a third modulator each having a pair of inputs and providing an output in accordance with the difference in frequencies of its inputs, means coupling the first and second receiving means to the respective inputs of the first modulator, means coupling the first receiving means and the second signal to the respective inputs of the second modulator, a frequency multiplier having a factor of multiplication equal to said certain integral multiple, means coupling the first modulator output to the frequency multiplier, and means coupling the output of the second modulator and the frequency multiplier to the respective inputs of the third modulator.

6. A distance measuring system including in combination means for transmitting a first and a second frequency modulated signal of different frequencies, the instananeous frequency difference between the two signals being constant, first means for receiving reflections of the first signal, second means for receiving reflections of the second signal, a first and a second and a third modulator each having a pair of inputs and providing an output in accordance with the difference in frequencies of its inputs, means coupling the first and second receiving means to the respective inputs of the first modulator, means coupling the first receiving means and the second signal to the respective inputs of the second modulator, and means coupling the outputs of the first and second modulators to the respective inputs of the third modulator.

7. A distance measuring system including in combination means for transmitting a first and a second frequency modulated signal of different frequencies, the instantaneous frequency difference between the two signals being constant, first means for receiving reflections of the first signal, second means for receiving reflections of the second signal, a modulator having a pair of inputs and providing an output in accordance with the difference in frequencies of its inputs, and means coupling the first and second receiving means to the respective inputs of the modulator.

8. A system for measuring the distance of a reflecting target including in combination means for providing a first signal which deviates from a certain reference frequency by a frequency which is equal to KV, where V is the velocity of the target and where K has a constant value, means for providing a second signal which deviates from said reference frequency by a frequency which is equal to $KV+CX$, where X is the distance of the target and where C has a constant absolute value, said reference frequency being large compared with said deviation frequencies, a modulator having a pair of inputs and providing an output in accordance with the difference in frequencies of its inputs, and means coupling the first and second signals to the respective inputs of the modulator, the modulator providing an output which deviates from zero cycles per second by a frequency equal to the absolute value of CX.

9. A system as in claim 8 in which the value of C is of constant polarity.

10. A system as in claim 8 in which the value of C is of alternate positive and negative polarity.

11. A system for measuring the magnitude and the polarity of the velocity of a reflecting target including in combination means for providing a signal which deviates from a certain reference frequency by a frequency which is proportional to the velocity of the target, the reference frequency being large compared with the deviation frequency, means including a modulator responsive to the signal for providing a first output which deviates from zero cycles per second by a frequency proportional to the absolute value of the target velocity, and means including a discriminator responsive to the signal for providing a second output indicating the polarity of the first output.

12. A distance measuring system including in combination means for providing a frequency modulated signal, means providing a first and a second constant frequency signal of different frequencies, a first and a second modulator each having a first and a second input and providing an output in accordance with the same algebraic combination of frequencies of its inputs, means coupling the first and second signals to the respective first inputs of the first and second modulators, and means coupling the frequency modulated signal to the second input of each modulator, the outputs of the modulators having a constant instantaneous frequency difference equal to the difference in frequencies of the first and second signals.

13. A distance measuring as in claim 12 in which each modulator provides an output in accordance with the algebraic sum of frequencies of its inputs.

14. A distance measuring system as in claim 12 in which each modulator provides an output in accordance with the algebraic difference in frequencies of its inputs.

15. A distance measuring system as in claim 12 in which the modulator outputs have certain average frequencies and in which the average output frequency of the first modulator is an integral multiple of said difference frequency.

16. A system for measuring the distance of a reflecting target including in combination means for providing a first and a second frequency modulated signal of different frequencies, the first and second signals having a constant instantaneous frequency difference, and means for transmitting said signals toward the target.

17. A system as in claim 16 in which each signal is frequency modulated in accordance with a saw-tooth waveform having a constant slope periodically interrupted by a rapid retrace.

18. A system as in claim 16 in which each signal is frequency modulated in accordance with a triangular waveform having alternate positive and negative slopes of equal absolute values.

19. A system for measuring the distance of a reflecting target including in combination means for providing a first and a second frequency modulated signal of different frequencies, the signals having certain average frequencies and a constant instantaneous frequency difference, the average frequency of the first signal being an integral multiple of said difference frequency, and means for transmitting said signals toward the target.

References Cited

UNITED STATES PATENTS

| | | | |
|---|---|---|---|
| 3,120,659 | 2/1964 | Wells et al. | 343—14 X |
| 3,168,735 | 2/1965 | Cartwright | 343—14 X |
| 3,197,773 | 7/1965 | Black et al. | 343—14 X |
| 3,199,102 | 8/1965 | Papanicolaou | 343—14X |
| 3,271,766 | 9/1966 | Nilssen | 343—14 |

FOREIGN PATENTS 942,784  11/1963  Great Britain.

RODNEY D. BENNETT, *Primary Examiner.*

J. P. MORRIS, *Assistant Examiner.*